United States Patent
Bastani et al.

(10) Patent No.: US 8,743,396 B2
(45) Date of Patent: Jun. 3, 2014

(54) PRINTING USING STORED LINEARIZATION DATA

(75) Inventors: Behnam Bastani, San Diego, CA (US); Alejandro Campillo, Encinitas, CA (US); Bryan Ly, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1024 days.

(21) Appl. No.: 12/808,062

(22) PCT Filed: Dec. 14, 2007

(86) PCT No.: PCT/US2007/025590
§ 371 (c)(1),
(2), (4) Date: Apr. 11, 2011

(87) PCT Pub. No.: WO2009/078828
PCT Pub. Date: Jun. 25, 2009

(65) Prior Publication Data
US 2011/0199634 A1    Aug. 18, 2011

(51) Int. Cl.
G06F 3/12 (2006.01)
G06F 15/00 (2006.01)
G06K 1/00 (2006.01)
H04N 1/46 (2006.01)

(52) U.S. Cl.
USPC ........... 358/1.15; 358/1.13; 358/1.9; 358/504

(58) Field of Classification Search
None
See application file for complete search history.

(56) References Cited

U.S. PATENT DOCUMENTS

| | | | |
|---|---|---|---|
| 5,802,420 | A | 9/1998 | Garr et al. |
| 5,809,213 | A | 9/1998 | Bhattacharjya |
| 6,832,824 | B1 | 12/2004 | Baker et al. |
| 6,851,785 | B2 | 2/2005 | Wu et al. |
| 7,027,185 | B2 | 4/2006 | Subirada et al. |
| 7,158,263 | B2 | 1/2007 | Allen et al. |
| 2002/0083852 | A1* | 7/2002 | Degani et al. ................ 101/171 |
| 2003/0025925 | A1* | 2/2003 | Elsman et al. ................ 358/1.9 |
| 2003/0043424 | A1 | 3/2003 | Bhaskar et al. |
| 2003/0086102 | A1* | 5/2003 | Soler et al. ................... 358/1.9 |
| 2003/0206308 | A1 | 11/2003 | Matsuya |
| 2003/0214657 | A1* | 11/2003 | Stringham .................... 358/1.1 |

(Continued)

FOREIGN PATENT DOCUMENTS

| | | |
|---|---|---|
| EP | 0983863 | 3/2000 |
| EP | 1431045 | 6/2004 |
| JP | 2000318266 A | 11/2000 |

OTHER PUBLICATIONS

International Searching Authority, ISA 220 ISR & Written Opinion, Aug. 29, 2008, 10 pages, Korean Intellectual Property Office, Republic of Korea.

*Primary Examiner* — Ming Hon (57) ABSTRACT

A method of printing comprising: storing a plurality of sets of linearization data (32) for a printhead (12; 14; 16; 18) with each set corresponding to a different history of usage of the printhead; monitoring (S210) the history of usage of the printhead; selecting (S220), prior to printing, from said plurality of sets of linearization data a set of linearization data that is the set that most closely matches the monitored history of usage of the printhead prior to said printing; and printing (S250) the image using the selected set of linearization data.

18 Claims, 9 Drawing Sheets

(56) References Cited

U.S. PATENT DOCUMENTS

| | | | |
|---|---|---|---|
| 2004/0046820 A1* | 3/2004 | Wu et al. | 347/19 |
| 2004/0207862 A1* | 10/2004 | Such et al. | 358/1.9 |
| 2005/0071104 A1* | 3/2005 | Viturro et al. | 702/85 |
| 2005/0162681 A1 | 7/2005 | Ng et al. | |
| 2006/0215239 A1* | 9/2006 | Iannazzi | 358/504 |
| 2007/0024647 A1 | 2/2007 | Cowan et al. | |
| 2007/0097159 A1 | 5/2007 | Bastani | |
| 2007/0253009 A1* | 11/2007 | Horn et al. | 358/1.9 |

* cited by examiner

PRINTING USING STORED LINEARIZATION DATA

A commonly used form of printer uses a moving printhead which scans from side to side across a print medium so as to build up a printed image on the medium. In this type of printer the print medium is generally stationary as the printhead is reciprocated back and forth. In this way swaths of an image are printed on the medium with the print medium being stepped after each swath. In contrast, in so-called "page wide array" or "full width" printers, fast printing can be achieved by using a fixed printhead array which spans the full width of the area of the medium to be printed. In such printers the print medium generally moves continuously with respect to the stationary printheads during the printing operation.

Printheads are typically manufactured in a manner that is in some ways similar to the manufacture of semiconductor integrated circuits. Full width array printheads are difficult and costly to manufacture in one unitary ("monolithic") printhead. The print swath for a printhead is thus typically limited by the difficulty in producing very large semiconductor chips or "die". The failure of any one of a large number of nozzles in a printhead can cause the loss of the entire full width printhead array. Because of this most full width array printheads are assembled from smaller subunits which can be individually tested prior to assembly into the full width printhead array.

Printhead dies invariable have different characteristics due to manufacturing variability, and the size of the ink drops produced by the printheads is variable within a manufacturing tolerance. For example different printhead die may print at slightly different densities. For scanning printers a printhead is scanned across the page and the colour content of the page will generally appear fairly consistent. However, the need to complete numerous carriage passes back and forth across a page has meant that scanning inkjet printers are typically significantly slower than other types of printer. On the other hand, page wide array printers, which general have several printheads linearly spaced across the print swath immediately adjacent to each other, have a comparatively quick printing speed. However, since such printheads are immediately adjacent to each other defects and variability in the ink drop size produced by the different printheads will be readily discernible, particularly when attempting to reproduce high quality graphics and images. One type of colour uniformity difficulty produced by such defects/manufacturing tolerances is banding at the swath boundaries.

Embodiments of the invention are set out according to the appended claims.

An embodiment of the invention provides a method of printing comprising: storing a plurality of sets of linearization data for a printhead with each set of data corresponding to a different degree of usage of the printhead; monitoring the degree of usage of the printhead; selecting a set of linearization data, from said plurality of sets, that matches the monitored degree of usage; and printing using said selected set of linearization data.

The degree of usage of the printhead may be determined from, for example, one of:
(i) the length of time that the printhead has been idle before said printing;
(ii) the amount of printed output the printhead has printed before said printing;
(iii) the length of time that the printhead has been printing before said printing; and
(iv) any combination of (i) to (iii).

An embodiment of the invention provides a method of printing comprising: storing a plurality of sets of linearization data for a printhead with each set corresponding to a different degree of usage of the printhead; monitoring the degree of usage of the printhead; and printing an image as part of a print job comprising printing one or more images using a set of linearization data selected from said plurality of sets of linearization data; wherein the selected set of linearization data corresponds to a degree of usage which most closely matches the monitored degree of usage of the printhead prior to said printing.

A print job can be considered to be a unit of work to be run on a printer and, for example, can comprise printing one or more files.

For the purposes of this specification the term "image" should be interpreted broadly to mean any type of printed output.

An embodiment of the invention provides a printing system comprising: printing means for printing images; storage means for storing a plurality of correction factors; monitor means for monitoring the history of usage of the printing means; and processing means for selecting one or more correction factors from the storage means that matches the monitored history of usage and operating the printing means using said selected one or more correction factors.

Embodiments of the invention will now be described by way of example with reference to the accompanying drawings.

The optical density of the printed output produced by a printhead can, to an extent, depend on characteristics of the printhead. These characteristics can vary with time. For example the temperature of a printhead generally changes during use. For example the printhead may be relatively cool at the start of a print job and heat up during the course of the print job. Such a temperature variation can manifest itself as changes in ink drop weight that can show up as non-uniformity in the colour of the printed output. That is, different prints of the same image can have different appearances according to the degree of usage of the printhead prior to the production of each particular print. As another example, when a printhead has been left idle (i.e. not printing) for a period then the ink held in the printhead can have a concentration gradient, for example, gravity may cause the ink toward the bottom of the printhead to have a higher concentration then the ink toward the top of the printhead. This effect is sometimes referred to as "ink enrichment" and can be another source of colour non-uniformity.

To maintain the quality of the printed output the first few prints produced by a prior art printhead during a printhead may be discarded until the printhead has achieved a steady state (e.g. at substantially constant temperature). This is wasteful of ink, print media and operating time. Some embodiments of the invention do not do this: they may keep and use even the first few prints produced.

A service station may be mounted within a printer to clean the printer's printheads. During a service operation ink is fired through the nozzles of the printhead in a process known in the printing arts as "spitting". Spitting is used for clearing debris from the printhead nozzles. Servicing the printheads at regular intervals can also be used to maintain colour uniformity, for example, spitting can be used to purge ink from the nozzle region of the printhead after the printhead has been stored or otherwise not been used for a long period of time (for example, to remove enriched ink from the vicinity of the nozzles). Servicing is therefore also wasteful of ink and operating time. Additionally, the ink collected from the spitting process will require disposal. Some embodiments of the present invention can be serviced less often than prior art printheads and still get good results.

To produce the range of tonal values required for graphics and photographs, printheads are typically calibrated, or "linearized", such that the print densities of halftone images substantially correspond to the densities of the continuous tone, or "contone" images, which are to be printed. Typically, measurements of the actual print density of the printhead are made over the range of print densities and a curve fitting routine then linearizes the data. The linearization data simply maps a set of input values to a new set of output values. The linearization data may be stored in a memory as a look-up-table (LUT) or as coefficients of an equation.

Figure 1:
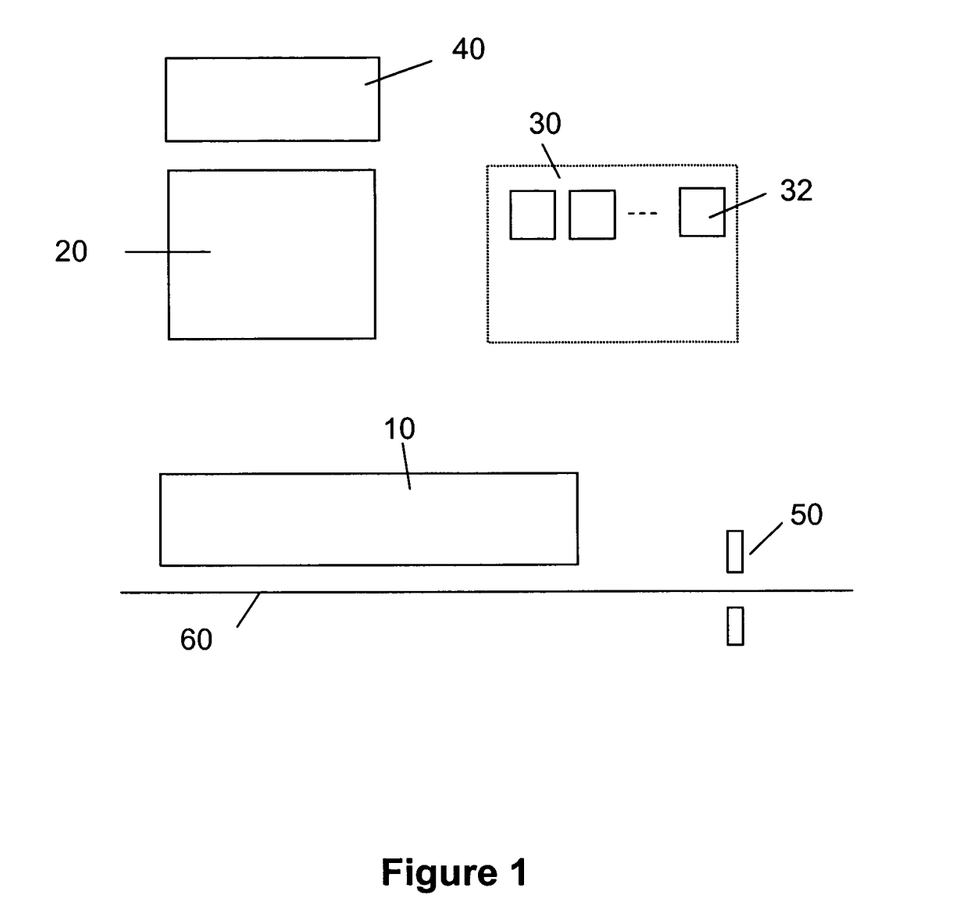
FIG. 1 illustrates a printing system according to an embodiment of the invention.

FIG. 1 illustrates a printing system comprising a printhead assembly 10 which is controlled by a processor 20 to print onto a print medium 60. The processor 20 has access to a memory 30 which stores linearization data 32 which is used as part of the print pipeline when printing an image. In an embodiment of the invention the linearization data 32 is generated by measuring an optical property of printed images produced by the printhead arrangement 10 using an optical sensor 50. The memory 30 may also contain pre-built linearization data, such as linearization tables, which can be updated according to measurements made by the optical sensor 50.

Some or all of the various components of the printing system may be housed together with the printhead assembly 10 in a printer or may be located remotely from the printhead assembly 10, for example as part of a computer system that is in wired or wireless connection with the printhead assembly 10. Some of the components may be configured to communicate with each via a local network (eg Ethernet) and/or via the Internet. For example the memory 30 and/or the processor 20 may be part of the printer (i.e. "on-board") or they may be remote from the printer. The memory and/or the processor may comprise a single memory/processor or may comprise a plurality of memories/processors. In some cases part of the memory and/or processor is on-board the printer whilst part of the memory and/or processor is remote from the printer.

A calibration routine may be performed for producing and/or updating the linearization data 32 held in the memory 30. The calibration routine may be performed before the printer is deployed in the field, for example, in a factory following the manufacture of the printer or otherwise prior to the sale or deployment of the printer. The calibration routine could also be performed in the field (either in addition to, or instead of, pre-deployment calibration).

The optical sensor may make measurements of optical density or may make measurements of luminosity, L*, (as will be discussed later) or some other optical property (eg reflectance, transmittance, absorbance). The optical sensor 50 could be an integral part of the printer (eg as a so-called "on-board" sensor) or it may be a separate system that is connected to the printer when calibration is required. For example, the optical sensor 50 may take the form of a high resolution instrument that is more suited to use in a factory setting than as an integral component of the printer that is actually sold/deployed. The optical sensor 50 may be suitable to form an integral/embedded part of the printer. In some embodiments the printer that is sold or otherwise deployed does not have an embedded optical sensor and calibration is performed either in the factory (i.e. offsite) or an optical sensor is connected to the printer to perform the calibration (eg as part of a servicing schedule or when the printheads or ink supply are changed). In some embodiments the optical sensor 50 may take the form of a densitometer.

The printhead assembly 10 may comprise one or more printheads. Inherent manufacturing imperfections and environmental conditions can affect the accuracy of printing within the same model or make of printhead and generally, when the printhead assembly comprises a plurality of printheads, linearization data is generated for each individual printhead.

Figure 2:
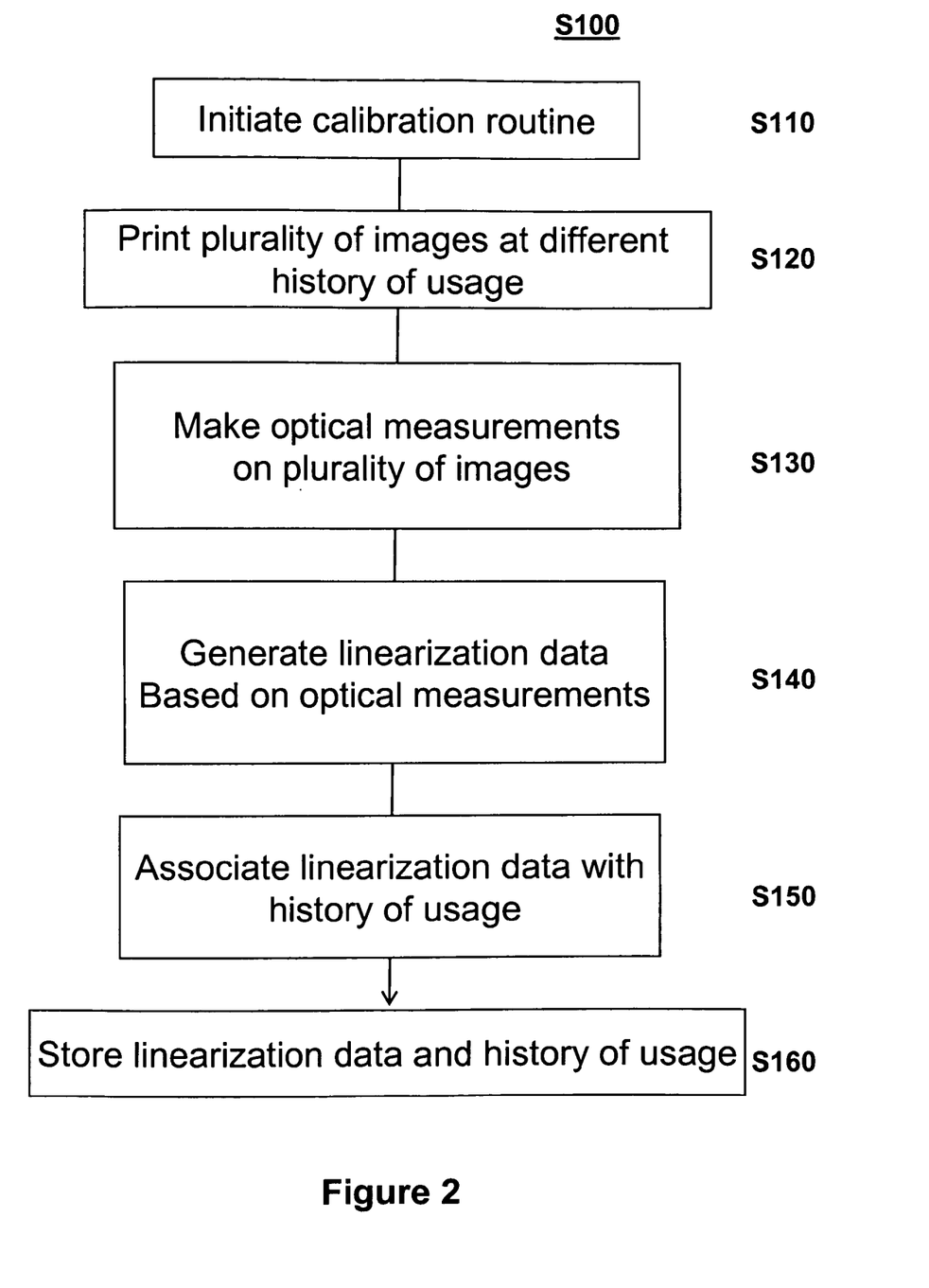
FIG. 2 is a flow diagram that illustrates a calibration routine according to an embodiment of the invention.

FIG. 2 is a flow diagram that illustrates a calibration routine S100 according to one particular embodiment of the invention.

At step S110 the calibration routine is initiated. The calibration routine could be initiated by user activation (say by pressing a button or a touch sensitive screen or by sending a message to the printer via a computer that is in communication with the printer). The calibration routine may also be initiated automatically, for example the calibration routine could be initiated whenever the printer is switched on, instructed to perform a print job, or has the printheads or ink supply changed. The calibration routine could also be preformed periodically, eg at set times or after set amounts of usage (which could be measured as an amount of time printing or as an amount or print produced (eg number of printed sheets produced)).

At step S120 a plurality of images are printed. The images may take the form of test patches or "targets". The targets may take the form of a "ramp" of print densities deposited on the print medium 60. By way of example, the ramp may include regions printed with sixteen discrete print densities. Print density is a measure of how much ink has been deposited on to an ink medium. It is a logarithmic scale with a density of 0.00 indicating that 100% of the light falling on the sample of print medium is being reflected, a density of 1.00 indicates that only 10% of the incident light falling on the sample is being reflected and a density of 2.00 indicates that only 10% of the incident light falling on the sample is being reflected etc.

Each image corresponds to a different degree of usage of the, or each, printhead in the printhead assembly 10. For example, the images could be printed consecutively so that each image corresponds to an increment to the amount of time that a printhead has been operating. In another example one or more images could be printed after different periods of time that a particular printhead has remained idle and/or stored.

The sensitivity of the appearance of the printed output to different histories of usage may be determined experimentally to ascertain appropriate periods at which to produce the printed images (targets). In one scenario the output from a printhead may depend on the time since the printhead was last used over a comparatively short time-scale (eg over a few seconds, tens of seconds, a few minutes or tens of minutes) due to the effect of the printhead cooling down since it was last used. In another scenario the output from a printhead may depend on the time since the printhead was last used over a comparatively large time-scale (eg over an hour, a few hours, a day or several days or longer) due to the ink enrichment effects (eg the ink settling toward the bottom of the printhead). In yet another scenario the removal of enriched ink from the printhead during the first few prints would cause a variation in the printed output over a short time-scale.

For a constant rate of printing (eg as measured in sheets/pages per unit time, images per unit time or whatever) then a certain time of printing will be correspond to certain amount of printing.

At step S130 optical measurements are made, using the optical sensor 50, on each of the plurality of images. The optical measurements may provide values of L* in a colour metric space known as CIE L*a*b* colour space ("CIELAB") established by the Commission International de l'Eclairage. CIELAB was developed to take into account the variation of the human eye's response to light across the range of visible wavelengths (i.e. colours). L* or luminosity is a measurement of optical density or lightness, with 0 being defined as pure black and 100 pure white. b* is a measurement along the yellow-blue coordinate. Negative a* is green and positive a* is red.

Figure 3:
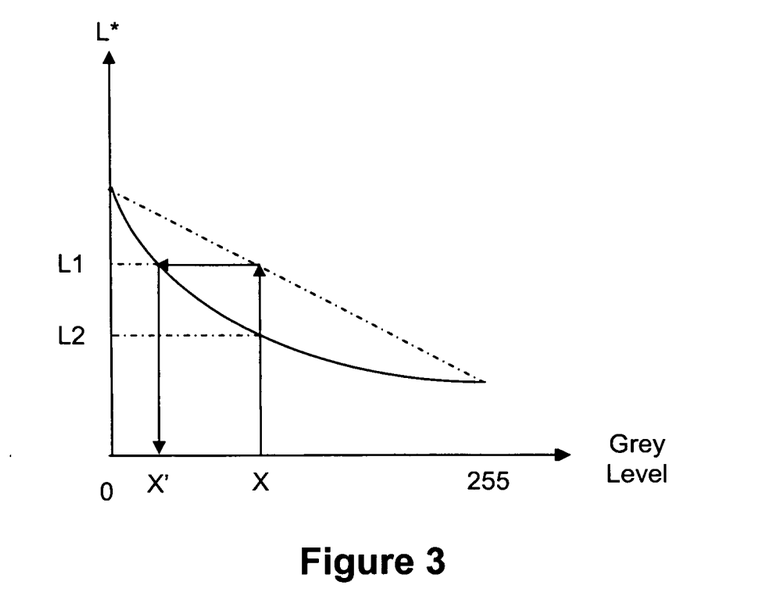
FIG. 3 is a graph of luminosity across an ink target according to an embodiment of the invention.

FIG. 3 is a graph with L* as a function of the tone value, in the range 0 to 255, for an ink target printed on the print medium 60. Generally the ink target will be produced using a single ink colour, for example it may be one of black, cyan, yellow or magenta ink. The values of L* may, for example, be derived from measurements of optical density (eg by using a densitometer) or by making measurements of L* directly.

Figure 4:
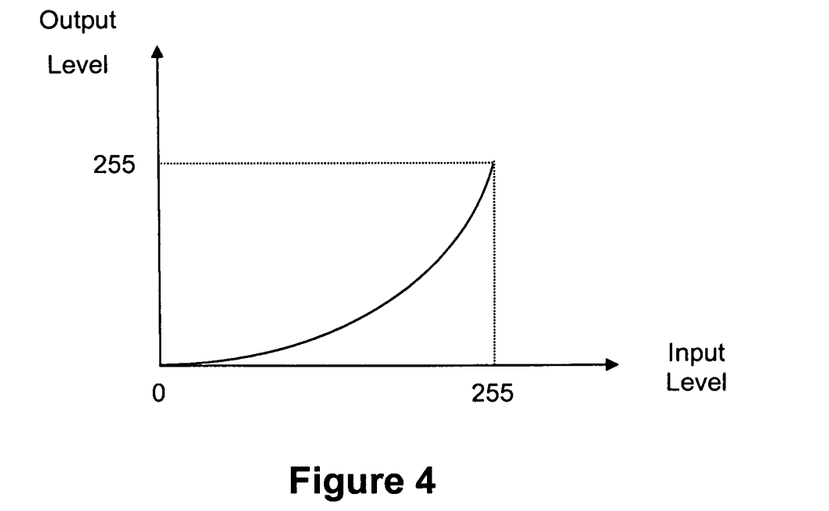
FIG. 4 is a plot illustrating an example linearization data set for a printhead according to an embodiment of the invention.

At step S140 linearization data is generated based on the optical measurements, for example, from the L* values. FIG. 4 is a plot depicting an exemplary linearization table for a printhead die. The plot shows the input level on the horizontal axis and the output level on the vertical axis. The response curve represents the calibration/correction that is necessary to cause the printhead to print tones linearly in the printer colour space. For example, the input level may be an 8-bit value from 0 to 255, which is converted to a linearized output level, also an 8 bit value from 0 to 255. The curve may be stored in the memory 30 as coefficients of a mathematical formula or as a table of values 32.

At step S150 the linearization data generated for each image is associated with the history of usage of the printhead when that image was produced. At step S160 the linearization data and the associated history of usage is stored in the printer's memory 30.

It should be appreciated that embodiments of the invention are not necessarily limited to the particular sequence of steps illustrated in FIG. 2 nor are all the illustrated steps necessarily essential. For example, rather than first printing a plurality of images (S120) then making optical measurements on these images (S130) an alternative would be to make the optical measurements and generate a set of linearization data for a particular printed image before proceeding to print another image from the plurality of images.

Figure 5:
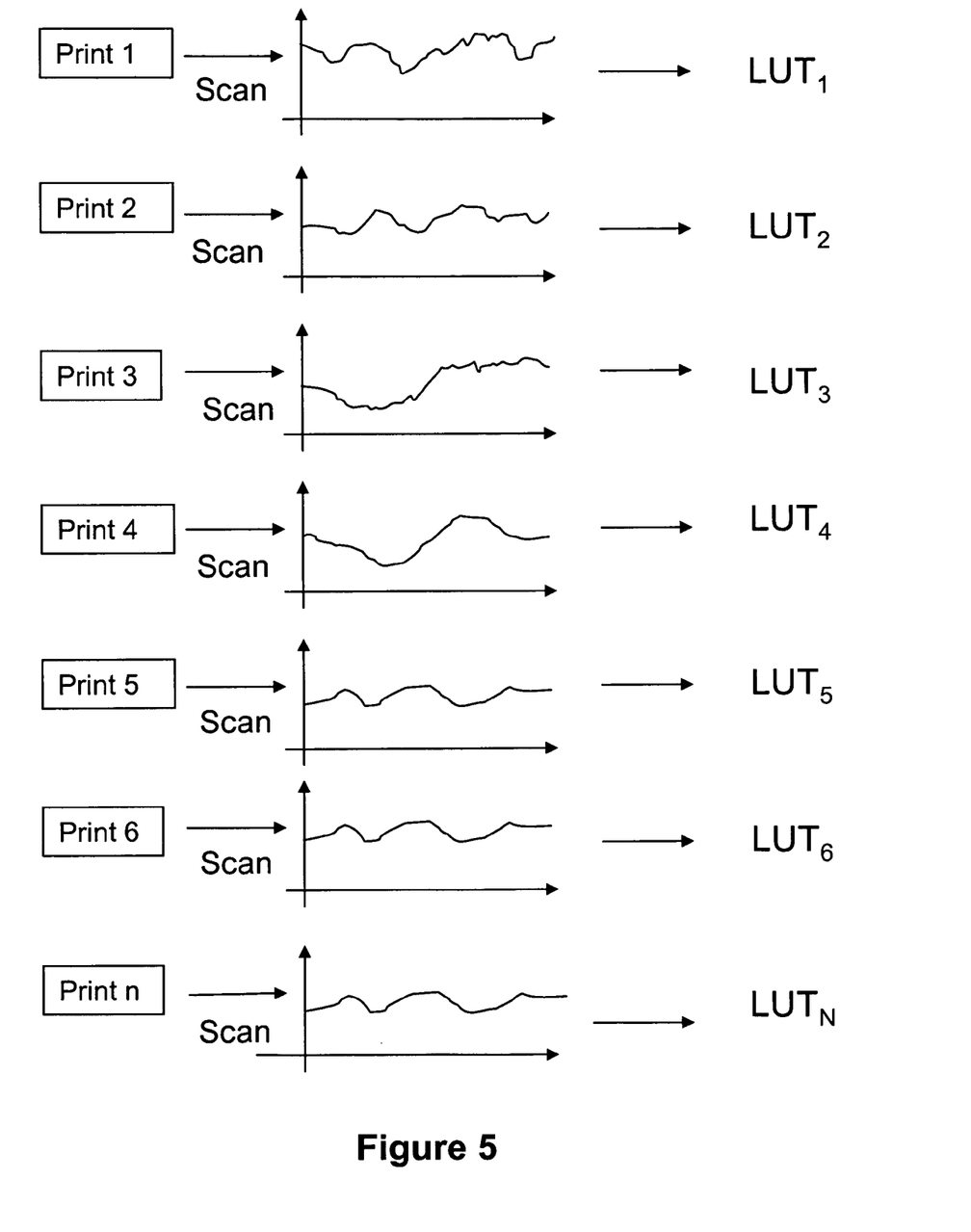
FIG. 5 illustrates, according to an embodiment of the invention, a plot of an optical property across a printed image for each of a plurality of prints.

FIG. 5 illustrates, for each of a number of consecutive prints (Print 1, Print 2, ... Print n), a graph that shows the variation of optical density or other optical property across the printed image. The graphs shown in FIG. 5 may be produced by scanning the optical sensor 50 across respective prints. Alternatively, the graphs may be produced without scanning, for example by using an optical sensor array or CCD camera that covers the full width (or a significant proportion of the full width) of the printed image. The measured optical property of an image can be used to produce a set of linearization data (eg in the form of a LUT) that can be associated with the history of usage of the printhead when that image is printed. It can be seen from FIG. 5 that the graphs produced from the first few prints show a large variation between each other. This variation may be due to, for example, the effect of temperature as the printhead heats up or by enriched ink being used up. For later images (eg images 5 and 6 and subsequent images in FIG. 5) there is little variation between the graphs, for example because the printhead has reached a steady-state temperature. It can be seen that the same linearization data may be used to print images after a certain number of images have been printed (eg after five prints using the illustration of FIG. 5).

In some embodiments, rather than generate a completely new set of linearization data for different images and different histories of usage a correction factor or set of correction factors may be applied to a reference set of linearization data to achieve a set of linearization that is relevant for the image to be printed. For example after running a calibration routine it may become apparent that the first few images that a printed are darker than the images printed when the printhead reaches a steady state. This may be due to, for example, ink enrichment effects that have caused a higher concentration of ink to settle near the printhead nozzles. A correction factor or factors may be applied to the set of linearization data used for steady state printing to produce a set of linearization data that can be used to make the appearance of the first few prints more consistent with the appearance of the steady state prints.

Figure 6:
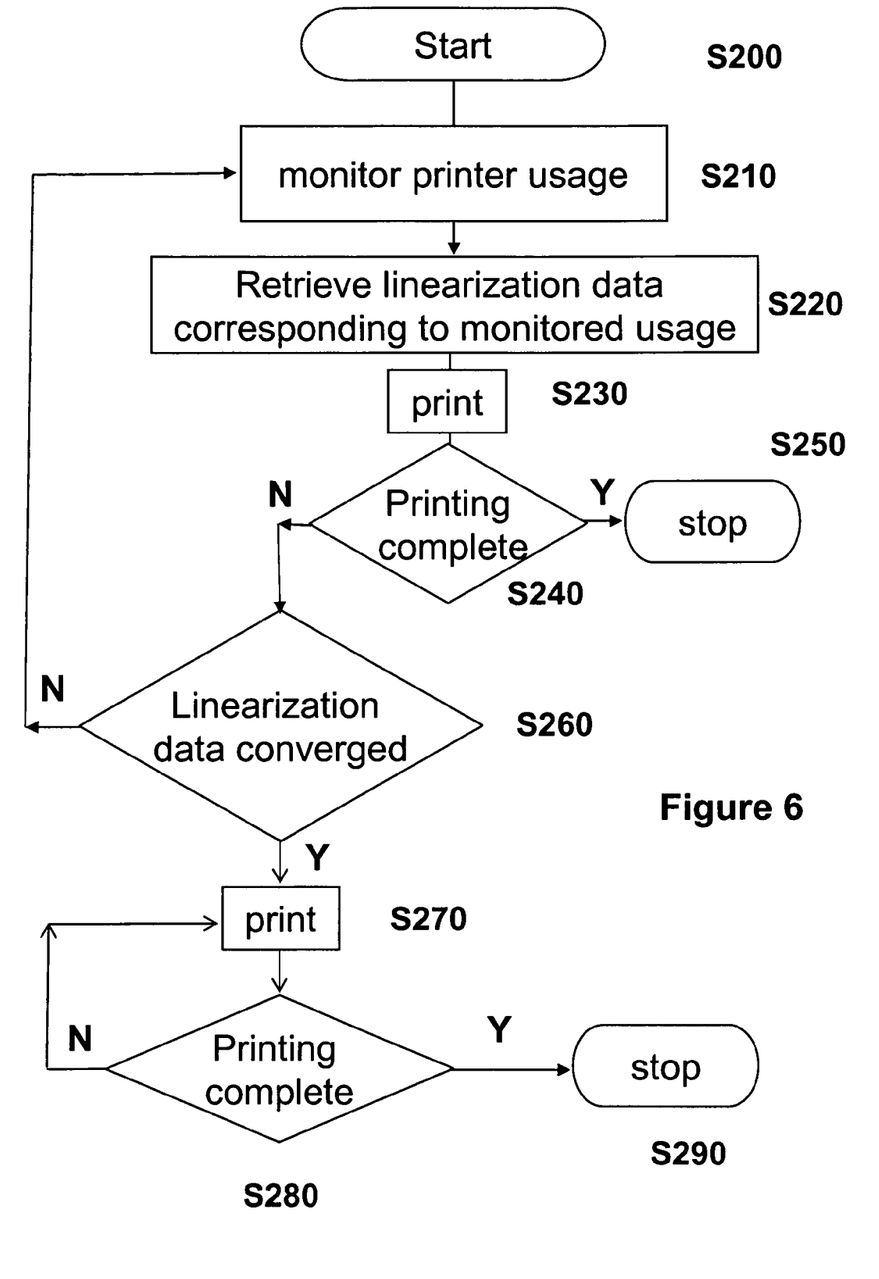
FIG. 6 is a flow diagram that illustrates a method printing according to an embodiment of the invention.

FIG. 6 is a flow diagram illustrating a method of printing according to a particular embodiment of the invention.

At step S200 the printing process is started when the printer receives a print job. The print job may contain one or more images to be printed.

At step S210 the degree of printer usage is determined before an image is printed. The printer usage may be monitored by a usage monitor 40 (illustrated in FIG. 1). The degree of printer usage may be determined in several different ways for example by determining any one of: the idle time of the printer before the print job commences; the amount of printing performed in the print job before the image is printed; the amount of printing performed in one or more previous print jobs before said image is printed; the length of time that the printer has been printing in the current print job, and/or previous print jobs, before said image is printed; and any combination of the aforementioned methods.

At step S220 a set of linearization data is retrieved from the memory 30 which has associated usage history data that most closely matches the printer usage history determined in step S210. Then, at step S230, an image is printed using the retrieved set of linearization data.

At step 240 a check is made as to whether printing is complete, that is that all the images in the print job have been printed. If the printing is complete the printing process stops at step S250.

At step S260, if the printing is not complete, the linearization data used to print the last image in step S230 is compared to the linearization data used to print the image or images previous to the last image. If the linearization data has not converged then the processing continues to step S210 where the printhead usage is again determined and the next image is printed using the linearization appropriate for current state of printhead usage for the next image. This processing repeats until either the linearization data has converged or the print job has finished.

At step S260, if the linearization data has converged then the same linearization data can be used to print subsequent prints at step S270 until printing is complete at step S280 and the printing processing stops at step S290. The linearization data may be considered converged when the linearization data sets for consecutive images are similar within a defined error or margin. The error/margin may be determined such that linearization data sets when applied to the same input data would produce an image that would give substantially the same appearance or such that the appearance of the two images would are acceptably close to each other. The error/margin may be preset when the printer is made or it may be a variable that a user may adjust. The convergence may be determined by comparing the linearization data of a printed image from the image printed immediately previously or the two (or more) images printed immediately previously to determine whether or not the linearization data for all the compared images has converged.

It will be appreciated that some printing applications may require different error/margins than others when determining convergence, for example the production of high quality brochures may require a high degree of convergence whilst the production of a draft document/work in progress document may only require a lesser degree of convergence.

Figure 6A:
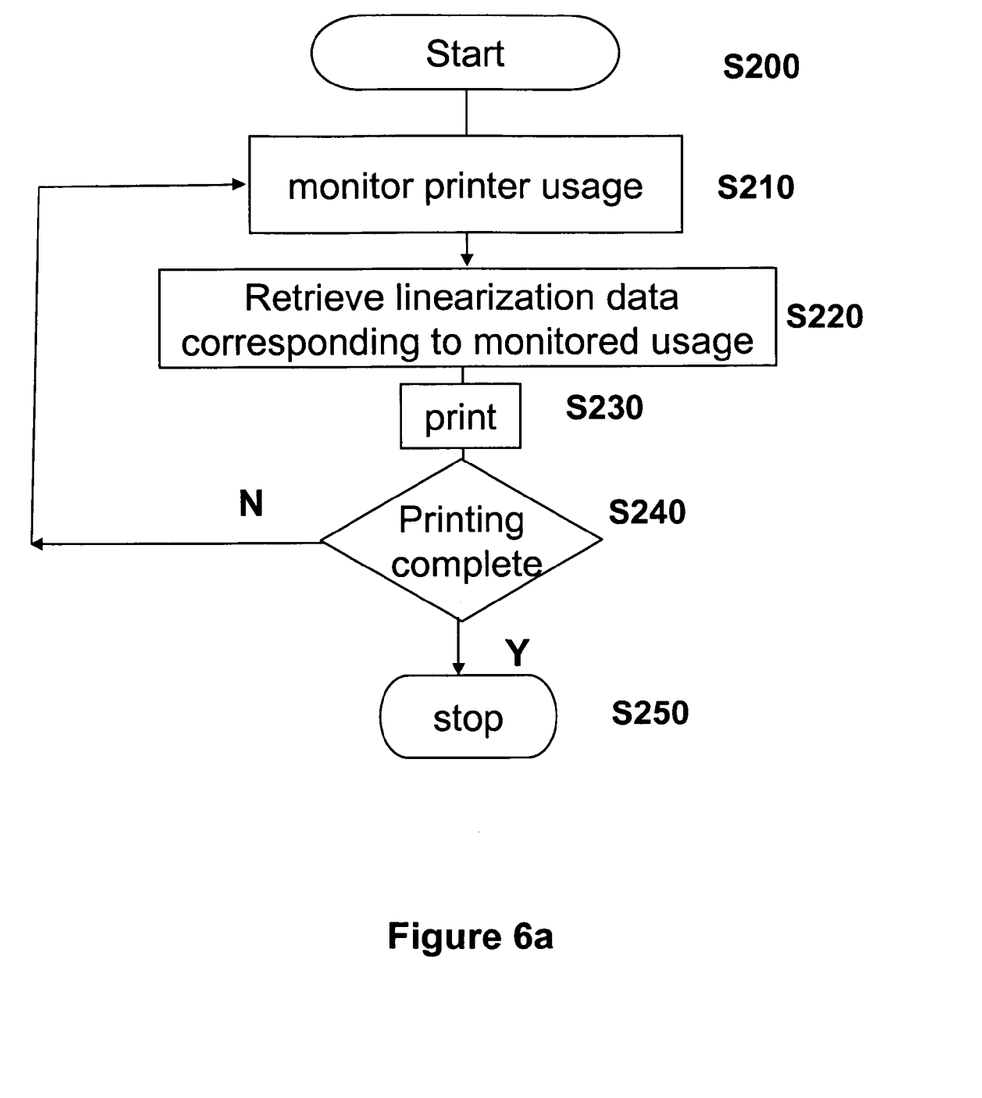
FIG. 6a is a flow diagram that illustrates a method printing according to an embodiment of the invention.

It should be appreciated that embodiments of the invention are not limited to the particular sequence of steps illustrated in FIG. 6 nor are all the steps necessarily essential. For example, as is illustrated in FIG. 6a, the steps which correspond to the checking for the convergence of the linearization data may be omitted.

Figure 7:
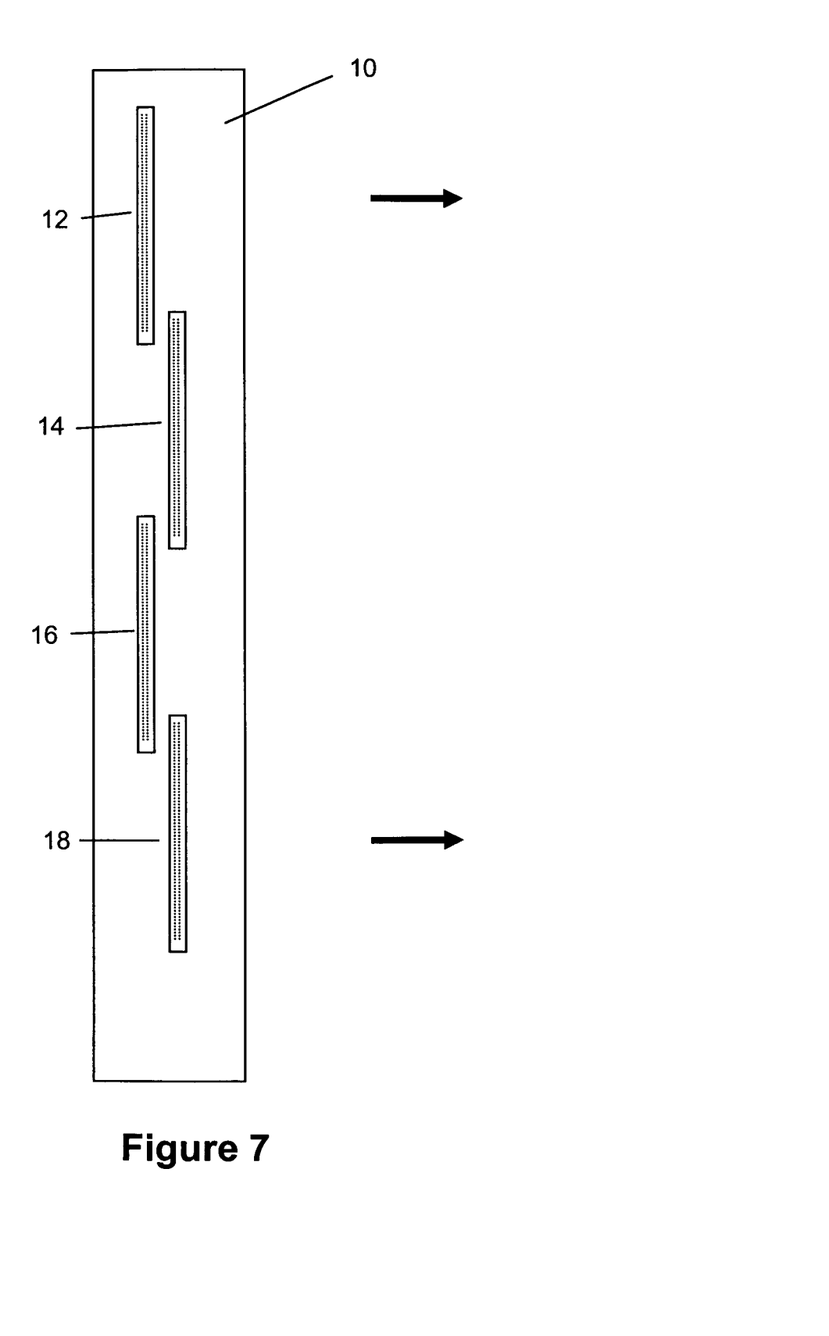
FIG. 7 is a schematic illustration of a printhead assembly presented as background to an embodiment of the invention.
Figure 8:
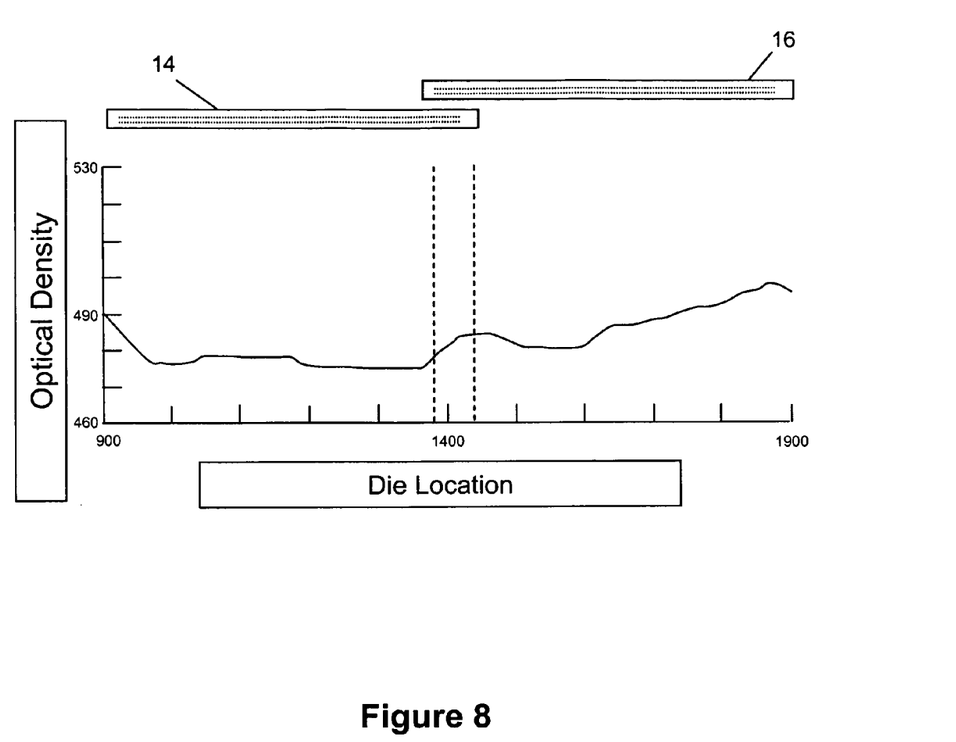
FIG. 8 is a graph showing the variation of optical density across two adjacent printhead dies according to an embodiment of the invention.

FIG. 7 illustrates an example of a printhead assembly 10 that comprises an array of multiple printheads 12, 14, 16, 18. Each printhead is shown having two linear arrays of print nozzles such as might be used to print two different ink colours. A printhead assembly 10 may include printheads for printing multiple ink colours or printing fluids, such as, for example, cyan, magenta, yellow, black and fixer. The individual printheads are generally staggered in a direction that is perpendicular to the direction of the media transport (indicated by arrows). Each printhead generally overlaps the span of adjacent dies by a small amount. FIG. 8 illustrates an example of the optical density variation typically found across two such adjacent printheads. The dotted lines on the FIG. 8 represent the region of overlap of the two printheads.

Figure 9:
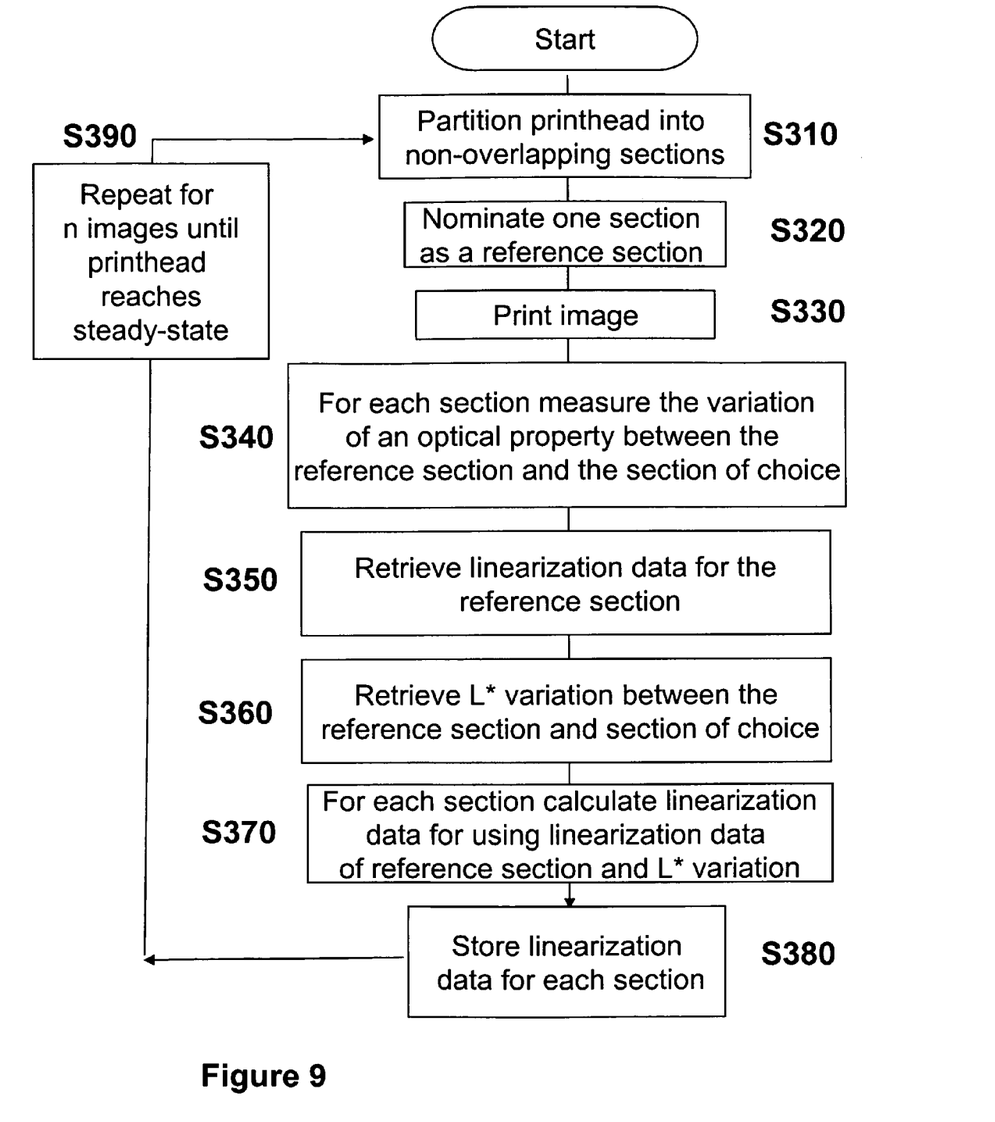
FIG. 9 is a flow diagram that illustrates a method of producing linearization data according to an embodiment of the invention.

The variation of the printed output of a printhead (or a number of printheads) can be corrected/ameliorated using the technique illustrated in the flow diagram of FIG. 9.

At step S310 the printhead is portioned into non-overlapping sections and a value of an optical property (for example the optical density or L*) is recorded for each section.

At step S320 one of the sections is nominated as a reference section. This allows the variation between a measured optical property of the reference section and the other sections to be quantified.

At step 330 an image is printed using the printhead. At step 340, for each section, the variation between an optical property (eg optical density) of the portion of the image corresponding to that section of the printhead with the portion of the image corresponding to the reference section of the printhead is determined.

At steps S350, S360 and S370, for each section, linearization data is generated by performing a transformation on linearization data associated with the reference section using the variation of the measured optical property between the reference section and the other sections.

At step S380 the linearization data is stored and/or used to print an image.

At step S390 the processing is repeated for subsequent images in a print job until the printhead reaches a steady state. Once the printhead is in a steady state the stored linearization data can be used for the remaining images.

It should be appreciated that embodiments of the invention are not limited to the particular sequence of steps illustrated in FIG. 9 nor should all the steps be considered essential.

For a printhead arrangement comprising a plurality of printheads the processing illustrated in FIG. 9 can be performed for each printhead. Variations in the printheads due to manufacturing tolerance will generally mean that the linearization data for each printhead will be different to each other. The printheads may also reach a steady-state at different times, for example, because the printheads use different inks, the printheads have a different position in the printer (eg causing some printheads to be hotter than others), and/or the printheads are different to each other (eg due to manufacturing tolerances or being a different type/model/manufacturer).

In an embodiment of the invention a computer program may be used to configure a printer/printing system to perform as has been described hereinabove. The computer program may be carried on a physical medium (eg on a floppy disc, CD, DVD, tape, EPROM, memory stick etc) or it may be downloaded into the memory 30 of the printing system via a communication link (eg the Internet, the Ethernet, or by some other network).

An embodiment of the invention provides a method of manufacturing a printer comprising: in factory/off site creation of linearization data (eg LUTs) for different print histories/usage and saving said linearization data in a memory; and loading a processor with instructions to monitor printer usage in the field and to select the linearization data from the memory which will most closely match the current history of usage and to use that linearization data in a printing operation.

In some embodiments the linearization data that is created "off site" is stored into a master memory and at least some of the linearization data is then copied from the master memory to a printer memory. Then, in order to perform a printing operation, linearization data can be selected from the printer memory according to the history of usage of that printer.

Such a method may also comprise loading the processor with instructions to enable the printer to check, from time to time, a printed image that has been printed in the field, and to self-calibrate itself, knowing its print history at the time of printing the image, by altering its instructions to influence what linearization data is selected from its memory for future print operations.

An embodiment of the invention provides a method of ameliorating ink enrichment effects when a printer and/or printhead has stood idle, not printing, and/or a method of ameliorating variations over time and/or spatial variations in printhead temperature, the method comprising: storing a plurality of sets of linearization data for a printer and/or printhead with each set corresponding to a different history of usage of the printer and/or printhead; monitoring the degree of usage of the printer and/or printhead; selecting, prior to printing the image, from said plurality of sets of linearization data a set of linearization data that is the set that most closely matches the monitored history of usage of the printer and/or printhead prior to said printing; and using the selected set of linearization data to print the image.

An embodiment of the invention provides a calibration routine comprising: printing a plurality of images with each image being printed after a different history of usage of a printhead; measuring an optical property of each of the printed images; using said measured optical property to associate different sets linearization data with respective different histories of usage; and storing the linearization data.

The calibration routine provides a method of establishing a set of linearization data to be used with a printer.

It should be appreciated that embodiments of the invention described and/or claimed in a particular category should also be taken to be disclosed in other categories. For example it should be appreciated that any particular printhead arrangement can be utilised in a printer/printing system and that the printhead arrangement of a particular printer/printing system may be made or sold separately from the printer/printing system. Similarly embodiments of the invention disclosed as methods can be realised as printers configured to perform such methods and vice versa. Furthermore, embodiments of the invention described in terms of a printer controller should be taken to be disclosed in terms of a printing system/method of printing and vice versa.

In some embodiments of the invention the history of a printer's usage prior to printing is used to determine the linearization data that is used in the printing. If the printer uses a plurality of printheads then when the printer is idle all the printheads are idle and the history of usage of the printer may be equally applicable to all the printheads. In another scenario a particular printhead, or group of printheads, may have recently been used to print a number of monochromatic images using, say, only black (K) ink. In this case the history of usage of the printhead that delivers the black ink will be different to the history of usage of the printer that delivers other colours of ink (eg C, Y, and M ink). Therefore, when printing a subsequent colour image, different degrees of usage for the different printheads should be considered when retrieving the linearization data required for that image. Therefore, when embodiments of the invention are set out in terms of printer usage then equivalent embodiments should be taken to be disclosed in terms of printhead usage and vice versa.

We claim:

1. A method of printing comprising:
    storing a plurality of sets of linearization data for a printhead with each set of stored linearization data corresponding to a different history of usage of the printhead;
    receiving a print job including one or more images to be printed;
    monitoring usage of the printhead before an image of the print job is printed;
    prior to printing said image, selecting, from said sets of stored linearization data, a set of stored linearization data corresponding to a history of usage of the printhead that most closely matches the monitored usage of the printhead; and
    printing said image using the selected set of stored linearization data.

2. The method of claim 1 wherein the monitored usage of the printhead is determined from one of:
    (i) the idle time of the printhead before the print job commences;
    (ii) the amount of printing performed in the print job before said image is printed;
    (iii) the amount of printing performed in one or more previous print jobs before said image is printed;
    (iv) the length of time the printhead has been printing in the print job before said image is printed;
    (v) the length of time the printhead has been printing in one or more previous print jobs before said image is printed; and
    (vi) any combination of (i) to (v).

3. The method of claim 1 further comprising performing a calibration routine comprising:
    printing a plurality of images with each image being printed after a different history of usage of the printhead;
    measuring an optical property of each of the printed images;
    using said measured optical property to associate different sets of linearization data with respective different histories of usage; and
    storing the linearization data.

4. The method of claim 3, wherein said associating comprises one of:
    (i) selecting one or more sets of linearization data from said plurality of stored sets of linearization data and associating said one or more selected sets of linearization data with respective one or more images from the plurality of printed images;
    (ii) updating one or more of said plurality of stored sets of linearization data and associating said one or more updated linearization data sets with respective one or more images from said plurality of printed images;
    (iii) generating one or more new sets of linearization data for one or more of the plurality of printed images and storing the new sets of linearization data; and
    (iv) any combination of (i) to (iii).

5. The method of claim 3 wherein the measured optical property provides values of L* in L*a*b* colour space for the, or each, ink used to print the printed image and the method further comprising using said value of L* to generate said linearization data.

6. The method of claim 1 wherein each set of linearization data comprises a look-up-table (LUT) or a set of coefficients of a mathematical equation.

7. The method of claim 1 wherein said printhead is one of a plurality of printheads and said printing comprises applying the method of claim 1 to each of the plurality of printheads.

8. A non-transitory computer readable medium containing program instructions for performing the method of claim 1.

9. A method of printing comprising:
    storing a plurality of sets of linearization data for a printhead with each set corresponding to a different history of usage of the printhead, the linearization data generated by:
        dividing the printhead into non-overlapping sections;
        selecting one section as a reference section and generating linearization data for that section;
        determining the variation between an optical property of a section of an image produced by the reference section of the printhead and a section of the image produced by one of the other sections of the printhead;
        producing the linearization data for the other section by mapping the linearization data of the reference section based on the optical property variation; and
        repeating said determining and said producing until linearization data has been produced for all the sections of the printhead;
    monitoring the history of usage of the printhead;
    selecting, prior to printing, from said plurality of sets of linearization data a set of linearization data that is the set that most closely matches the monitored history of usage of the printhead prior to said printing; and
    printing using the selected set of linearization data.

10. The method of claim 9 wherein the optical property is L* in L*a*b* colour space.

11. The method of claim 9 comprising generating linearization data for a portion of the printhead that corresponds to a transition between adjacent sections of the printhead by interpolating between the linearization data of said adjacent sections of the printhead.

12. A printing system comprising:
one or more printheads;
a memory to store a plurality of sets of linearization data, each set of stored linearization data corresponding to a different history of usage of the one or more printheads;
a monitor to monitor usage of the one or more printheads; and
a processor to select a set of stored linearization data according to the monitored usage of the one or more printheads prior to operating the one or more printheads to print a print job and to operate the one or more printheads with said selected set of stored linearization data to print said print job, said selected set of stored linearization data corresponding to a history of usage of the one or more printheads that most closely matches the monitored usage of the one or more printheads.

13. The printing system of claim 12 wherein said monitor comprises a clock configured for one of:
(i) timing the period that the one or more printheads are idle prior to operating said printheads;
(ii) timing the period that the printing system is printing prior to said operating said printheads; and
(iii) a combination of (i) and (ii).

14. The printing system of claim 12 wherein said monitor comprises a counter configured to count the number of images or sheets of print printed by the printing system prior to said printing.

15. The printing system of claim 12 wherein each set of linearization data comprises a look-up-table (LUT) or a set of coefficients of a mathematical equation.

16. The printing system of claim 12, wherein the memory is pre-loaded with at least some of said plurality of sets of linearization data.

17. The printing system of claim 12, wherein the processor is configured to execute a calibration routine to perform any one of:
(i) generate said plurality of sets of linearization data stored in the memory;
(ii) adjust at least some of said plurality of sets of linearization data stored in the memory;
(iii) supplement said plurality of sets of linearization data stored in the memory with additional linearization data; and
(iv) any combination of (i) to (iii).

18. The printing system of claim 17, wherein the processor is configured to execute said calibration at instances chosen from any one of:
(i) at the start of a print job;
(ii) after a defined number of prints;
(iii) after a defined period of printing;
(iv) after a set idle time;
(v) when one or more of the printheads have been changed
(vi) when the type of print medium used by the printing system has been changed; and
(vii) any combination of (i) to (vi).

* * * * *